US009813452B2

(12) United States Patent
Oshurkov et al.

(10) Patent No.: US 9,813,452 B2
(45) Date of Patent: Nov. 7, 2017

(54) DIGITAL RIGHTS MANAGEMENT SYSTEM PROVIDING EVENT NOTIFICATIONS FOR USER ACTIONS BASED ON ACCESS CONTROL RULES

(71) Applicant: KONICA MINOLTA LABORATORY U.S.A., INC., San Mateo, CA (US)

(72) Inventors: Aleksandr Oshurkov, Belmont, CA (US); Rabindra Pathak, San Jose, CA (US)

(73) Assignee: KONICA MINOLTA LABORATORY U.S.A., INC., San Mateo, CA (US)

( * ) Notice: Subject to any disclaimer, the term of this patent is extended or adjusted under 35 U.S.C. 154(b) by 90 days.

(21) Appl. No.: 14/951,066

(22) Filed: Nov. 24, 2015

(65) Prior Publication Data
US 2017/0149829 A1     May 25, 2017

(51) Int. Cl.
*G06F 21/00* (2013.01)
*H04L 29/06* (2006.01)
(Continued)

(52) U.S. Cl.
CPC .............. *H04L 63/20* (2013.01); *G06F 21/10* (2013.01); *G06F 21/604* (2013.01); *H04L 63/10* (2013.01)

(58) Field of Classification Search
CPC ........ G06F 21/60; G06F 21/604; G06F 21/62; G06F 21/6209; G06F 21/6218; G06F 21/6227; G06F 21/6272
See application file for complete search history.

(56) References Cited

U.S. PATENT DOCUMENTS

| 2008/0307321 | A1* | 12/2008 | Long | G06Q 10/10 |
| | | | | 715/752 |
| 2014/0281870 | A1* | 9/2014 | Vogel | G06F 17/246 |
| | | | | 715/220 |
| 2015/0229647 | A1* | 8/2015 | Avery | H04L 63/101 |
| | | | | 726/30 |

FOREIGN PATENT DOCUMENTS

WO       2014158815       10/2014

OTHER PUBLICATIONS

Adobe Systems Incorporated, "Adobe LiveCycle ES3 Overview: Rights Management", http://help.adobe.com/en_US/livecycle/10.0/OverviewNVS92d06802c76abadb2c8525912ddcb9aad9-7ff8.html, 7 pages, printed from the internet on Apr. 15, 2014.
(Continued)

*Primary Examiner* — Edward Zee
(74) *Attorney, Agent, or Firm* — Chen Toshimura LLP

(57) ABSTRACT

In a digital rights management system, a rights management server sends event notifications to certain users when other users perform certain actions (read, print, copy, etc.) on documents managed by the system. For each document, a notification rule defines which users will receive what event notifications for that document. The notification rule is determined based on document access permissions possessed by the users, so that only users who have permission to perform an action on the document will receive notifications when other users perform that action on the document, while users with no permission to perform an action will not receive notifications when other users perform that action. The server also allows the users who have permission to perform an action to opt out of the notifications. The server monitors events that occur on the documents, and sends event notifications to appropriate users according to the notification rules.

20 Claims, 11 Drawing Sheets

(51) Int. Cl.
  *G06F 21/10* (2013.01)
  *G06F 21/60* (2013.01)

(56) References Cited

OTHER PUBLICATIONS

Adobe Systems Incorporated, "Programmatically applying policies", http://help.adobe.com/en_US/livecycle/10.0/Overview/WSb96e41f8a4ca47a9-4882aeb5131190eddba-8000.html, 1 page, printed from the internet on Apr. 9, 2014.
Adobe Systems Incorporated, "LiveCycle® ES Java™ API Reference", http://livedocs.adobe.com/livecycle/es/sdkHelp/programmer/javadoc/index.html, 3 pages, printed from the internet on Apr. 9, 2014.
Microsoft, "Active Directory Rights Management Services", http://technet.microsoft.com/en-us/windowsserver/dd448611.aspx, 2 pages, printed from the internet on Nov. 10, 2014.
Microsoft, "AD RMS Overview", http://msdn.microsoft.com/library/cc530389(VS.85).aspx, 6 pages, printed from the Internet on Nov. 10, 2014.
Microsoft, "Using the AD RMS SDK", http://msdn.microsoft.com/en-us/library/cc542552(v=vs.85).aspx, 1 page, printed from the internet on Nov. 10, 2014.
Microsoft, "AD RMS Documentation Roadmap", http://technet.microsoft.com/en-us/library/dd772711.aspx, 3 pages, printed from the internet on Nov. 10, 2014.

* cited by examiner

| User ID | Group | Role (Title) | Email Address | Phone Number | Skype Account | ...... |
|---|---|---|---|---|---|---|
| Amy | Development | General Manager | ...... | ...... | ...... | ...... |
| Brian | Development | Senior Engineer | ...... | ...... | ...... | ...... |
| Carl | Marketing | Group Manager | ...... | ...... | ...... | ...... |
| David | HR | Group Manager | ...... | ...... | ...... | ...... |
| Frank | Development | Engineer | ...... | ...... | ...... | ...... |
| Gil | Marketing | Assistant | ...... | ...... | ...... | ...... |
| Harry | Development | Assistant | ...... | ...... | ...... | ...... |
| Jake | HR | Assistant | ...... | ...... | ...... | ...... |
| ...... | ...... | ...... | ...... | ...... | ...... | ...... |

| Doc ID | Permission Policy ID |
|---|---|
| Doc_001 | Development |
| Doc_002 | Project X |
| Doc_003 | Project X |
| Doc_004 | Manager |

| Notification Policy ID | Narrowing down by Group | Narrowing down by Role | Allowing Change of Rule | Notifying User List | Expired |
|---|---|---|---|---|---|
| NotificationPolicy_1 | No | No | Yes | Yes | Yes |
| NotificationPolicy_2 | Yes | No | No | No | Yes |
| NotificationPolicy_3 | No | Yes | Yes | Yes | Yes |
| NotificationPolicy_4 | Yes | Yes | Yes | Yes | Yes |

| Permission Policy ID | User ID | Read | Print | Copy |
|---|---|---|---|---|
| Development | Amy | Yes | Yes | Yes |
| | Brian | Yes | Yes | No |
| | Frank | Yes | No | No |
| | Harry | Yes | No | No |
| Manager | Amy | Yes | Yes | Yes |
| | Carl | Yes | Yes | Yes |
| | David | Yes | Yes | No |
| Project X | Frank | Yes | Yes | Yes |
| | Brian | Yes | Yes | Yes |
| | Gil | Yes | Yes | Yes |
| | Harry | Yes | Yes | Yes |
| | Jake | Yes | Yes | Yes |
| All_1 | Amy | Yes | Yes | Yes |
| | Brian | Yes | No | No |
| | Carl | Yes | Yes | No |
| | David | Yes | Yes | No |
| | Frank | Yes | No | No |
| | Gil | Yes | No | No |
| | Harry | Yes | No | No |

| Document ID | Notification Policy ID | User ID | Read | Print | Copy |
|---|---|---|---|---|---|
| Doc_001 | NotificationPolicy_1 | Amy | Yes | Yes | Yes |
| | | Brian | Yes | Yes | No |
| | | Frank | Yes | No | No |
| | | Harry | Yes | No | No |
| Doc_002 | NotificationPolicy_2 | Frank | Yes | Yes | Yes |
| | | Brian | Yes | Yes | Yes |
| | | Gil | Yes | Yes | Yes |
| | | Harry | Yes | Yes | Yes |
| | | Jake | Yes | Yes | Yes |
| Doc_003 | NotificationPolicy_3 | Amy | Yes | Yes | Yes |
| | | Brian | Yes | No | No |
| | | Carl | Yes | Yes | No |
| | | David | Yes | Yes | No |
| | | Frank | Yes | No | No |
| | | Gil | Yes | No | No |
| | | Harry | Yes | No | No |
| Doc_004 | NotificationPolicy_4 | Amy | Yes | Yes | Yes |
| | | Brian | Yes | No | No |
| | | Carl | Yes | Yes | No |
| | | David | Yes | Yes | No |
| | | Frank | Yes | No | No |
| | | Gil | Yes | No | No |
| | | Harry | Yes | No | No |

Fig. 6

| User ID | Read | Print | Copy |
|---|---|---|---|
| Amy | Yes | Yes | Yes |
| Brian | Yes | Yes | No |
| Frank | Yes | No | No |
| Harry | Yes | No | No |

(for Amy)

| User ID | Read | Print | Copy |
|---|---|---|---|
| Amy | Yes | Yes | |
| Brian | Yes | Yes | |
| Frank | Yes | No | |
| Harry | Yes | No | |

(for Brian)

| User ID | Read | Print | Copy |
|---|---|---|---|
| Amy | Yes | | |
| Brian | Yes | | |
| Frank | Yes | | |
| Harry | Yes | | |

(for Frank or Harry)

Fig. 11

```
                                                                    1200
┌─────────────────────────────────────────────────────┐
│  Document ID: Doc_001                                │
│                                                      │
│  Notification Setting                          1205  │
│  Read     ● ON   ◎ OFF   Method  ☑ Email    ▼      │
│                                   ☐ SMS              │
│  Print    ● ON   ◎ OFF   Method  ☑ Messenger        │
│                                   ☐ Social Network  │
│  Copy     ● ON   ◎ OFF   Method   Email      ▽      │
│                                                      │
│  Expired  ● ON   ◎ OFF   Method   Email      ▽      │
└─────────────────────────────────────────────────────┘
                      (for Amy)
```

1201 — Read
1202 — Print
1203 — Copy
1204 — Expired

```
                                                                    1210
┌─────────────────────────────────────────────────────┐
│  Document ID: Doc_001                                │
│                                                      │
│  Notification Setting                                │
│                                                      │
│  Read     ● ON   ◎ OFF   Method   Email      ▽      │
│                                                      │
│  Print    ● ON   ◎ OFF   Method   Email      ▽      │
│                                                      │
│  Copy     (no copy permission)                       │
│                                                      │
│  Expired  ● ON   ◎ OFF   Method   Email      ▽      │
└─────────────────────────────────────────────────────┘
                      (for Brian)
```

1211 — Read
1212 — Print
1213 — Copy
1214 — Expired

```
                                                                    1220
┌─────────────────────────────────────────────────────┐
│  Document ID: Doc_001                                │
│                                                      │
│  Notification Setting                                │
│                                                      │
│  Read     ● ON   ◎ OFF   Method   Email      ▽      │
│                                                      │
│  Print    (no print permission)                      │
│                                                      │
│  Copy     (no copy permission)                       │
│                                                      │
│  Expired  ● ON   ◎ OFF   Method   Email      ▽      │
└─────────────────────────────────────────────────────┘
                  (for Frank or Harry)
```

1221 — Read
1222 — Print
1223 — Copy
1224 — Expired

Fig. 12

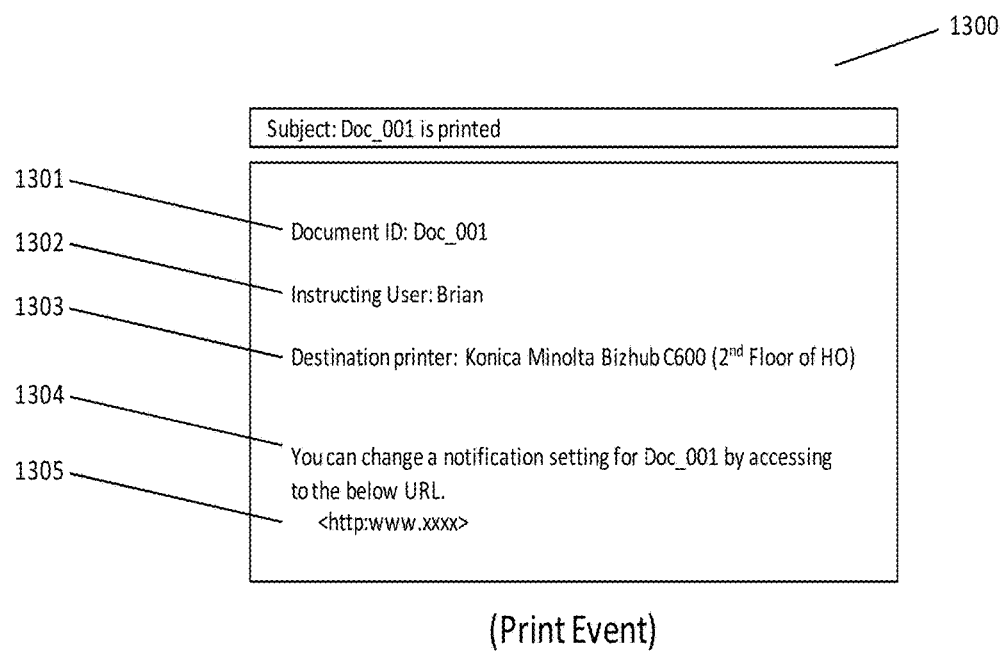
(Print Event)
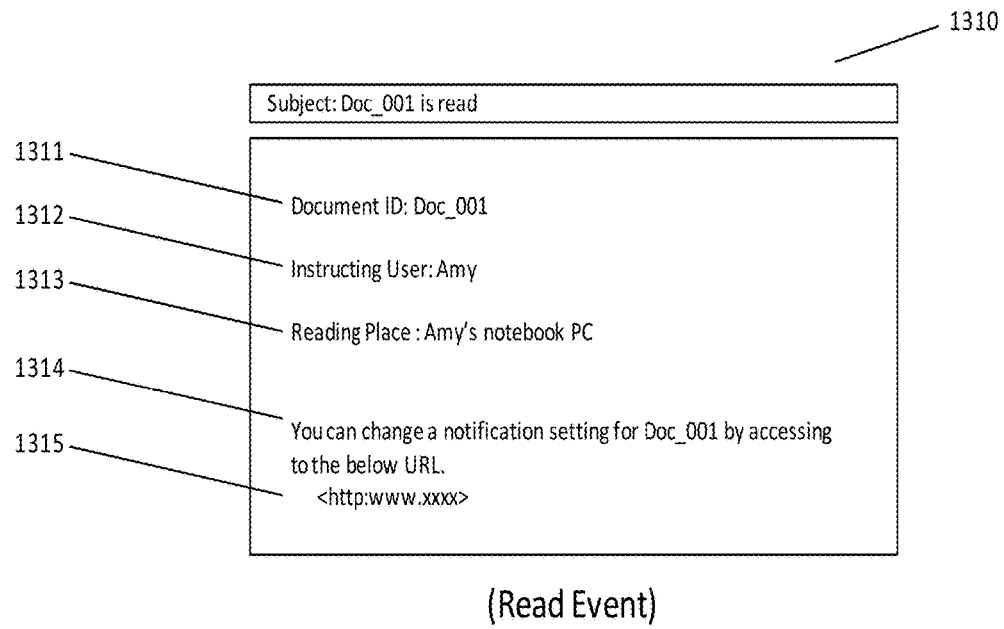
(Read Event)
Fig. 13

| User ID | Read | Print | Copy |
|---|---|---|---|
| Amy | Yes | Yes | Yes |
| Brian | Yes | No | No |
| Frank | Yes | Yes | No |
| Harry | No | No | No |

(for Amy)   Highlighted setting has been

| User ID | Read | Print | Copy |
|---|---|---|---|
| Amy | Yes | | |
| Brian | Yes | No | |
| Frank | Yes | | |
| Harry | No | | |

(for Brian)

| User ID | Read | Print | Copy |
|---|---|---|---|
| Amy | Yes | Yes | |
| Brian | Yes | No | |
| Frank | Yes | Yes | |
| Harry | No | No | |

(for Frank)

| User ID | Read | Print | Copy |
|---|---|---|---|
| Amy | | | |
| Brian | | | |
| Frank | | | |
| Harry | No | | |

(for Harry)

Fig. 14

DIGITAL RIGHTS MANAGEMENT SYSTEM PROVIDING EVENT NOTIFICATIONS FOR USER ACTIONS BASED ON ACCESS CONTROL RULES

BACKGROUND OF THE INVENTION

Field of the Invention

This invention relates to a digital rights management system, and in particular, it relates to a digital rights management system that provides event notifications about user actions to other users based on user access control rules.

Description of Related Art

Documents traditionally available only in hard copies are increasingly also available in digital copies. In fact many documents nowadays are prepared, generated, stored, distributed, accessed, read or otherwise used electronically in digital file formats such as the Portable Document Format (PDF). With the wide use of digital documents and digital document processing, digital rights management systems ("DRM" or "RMS") are increasingly implemented to control user access and prevent unauthorized use of digital documents. The rights involved in using a digital document may include the right to view (or "read") the digital document, the right to edit (or "write") the digital document, the right to print the digital document in hard copies, the right to copy the digital document, etc. A user may access a digital document by acquiring (or being assigned) one or more of these rights.

DRM systems are generally implemented for managing users' rights to the digital documents stored in the systems. In a current DRM system, each digital document is associated with a rights management policy (or simply referred to as policy in this disclosure) that specifies which user has what rights to the document, as well as other parameters relating to access rights. Many such policies are stored in a DRM server (also called RMS server). The server also stores a database table that associates each document (e.g. by a unique ID, referred to as document ID or license ID) with a policy (e.g. by policy ID). Each digital document may also have metadata that contains the document ID. When a user attempts to access a document (either a document residing on a server or a document that has been downloaded or copied to the user's computer) using an application program such as Adobe™ or Acrobat™ or Acrobat™ Reader™, the application program on the client computer contacts the RMS server to request permission. The server determines whether the requesting user has the right to access the document in the attempted manner (view, edit, print, etc.), by determining the policy associated with the document and then referring to the content of that policy. The server then transmits an appropriate reply to the application program to grant or deny the access. If access is granted, the server's reply may contain a decryption key for the client computer to decrypt the document.

The description herein of the structures, functions, interfaces and other relevant features, such as digital rights policies, application programming interface (API) for rights management and policies, etc., of existing DRM systems may at times incorporates, references or otherwise uses certain information, documents and materials from publicly and readily available and accessible public information, e.g., for Adobe™ LiveCycle™: "Rights Management" (URL http://help.adobe.com/en_US/livecycle/10.0/Overview/WS92d06802c76abadb2c8525912ddcb9aad9-7ff8.html), "Programmatically applying policies (a subsection of 'Rights Management')", (URL http://help.adobe.com/en_US/livecycle/10.0/Overview/WSb96e41f8a4ca47a9-4882aeb5131190eddba-8000.html), "LiveCycle® ES Java™ API Reference" (URL http://livedocs.adobe.com/livecycle/es/sdkHelp/programmer/javadoc/index.html), etc. The Microsoft™ ADRMS system is also a digital rights management system.

SUMMARY

Embodiments of the present invention enhance effectiveness of the DRM system by providing relevant event notifications to users which alert such users of actions taken by other users. The event notifications further alert users of changes of access rights granted to other users. Such event notifications help to better enforce the access control that is implemented by the DRM system.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and/or other objects, as embodied and broadly described, the present invention provides a digital rights management method implemented in a server of a digital right management (DRM) system, which includes: (a) obtaining a permission policy that is associated with a digital document managed by the DRM system, wherein the permission policy defines, for each of a plurality of users of the DRM system, whether or not the user has permission to take each of a plurality of actions on the document; (b) generating a notification rule for the document based on the permission policy obtained in step (a), wherein the notification rule defines, for each of the plurality of users, a plurality of notification settings corresponding to the plurality of actions, wherein the notification setting corresponding to a given action is always set to Off if the user does not have permission to take the corresponding action under the permission policy, and wherein the notification setting corresponding to a given action is initially set to On if the user has permission to take the corresponding action under the permission policy; (c) continuously monitoring actions taken by any of the plurality of users on the document; and (d) when an action by a user on the document is detected in step (c), sending event notifications to some or all of the plurality of users whose notification settings corresponding to the action are set to On, without sending event notifications to any of the plurality of users whose notification settings corresponding to the action are set to Off.

In another aspect, the present invention provides a computer program product comprising a computer usable non-transitory medium (e.g. memory or storage device) having a computer readable program code embedded therein for controlling a data processing apparatus, the computer readable program code configured to cause the data processing apparatus to execute the above method.

It is to be understood that both the foregoing general description and the following detailed description are exemplary and explanatory and are intended to provide further explanation of the invention as claimed.

BRIEF DESCRIPTION OF THE DRAWINGS

FIG. 2 schematically illustrates an example of a user table maintained by the RMS server according to an embodiment of the present invention.

FIG. 3 schematically illustrates an example of a permission policy table maintained by the RMS server according to an embodiment of the present invention.

FIG. 4 schematically illustrates an example of a document—permission policy association table maintained by the RMS server according to an embodiment of the present invention.

FIG. 5 schematically illustrates an example of a notification policy table maintained by the RMS server according to an embodiment of the present invention.

FIG. 6 schematically illustrates an example of a notification rule table maintained by the RMS server according to an embodiment of the present invention.

FIG. 11 schematically illustrates examples of a window displayed to notified users to inform them of other users' access rights according to an embodiment of the present invention.

FIG. 12 schematically illustrates examples of a window displayed to notified users to allow them to change their notification settings according to an embodiment of the present invention.

FIG. 13 schematically illustrates examples of notification messages displayed to notified users to inform them of events that occurred on protected documents according to an embodiment of the present invention.

FIG. 14 schematically illustrates examples of notifications sent to various users when a change of permission policy for a document occurred.

DETAILED DESCRIPTION OF PREFERRED EMBODIMENTS

Embodiments of the present invention provide a DRM system which sends event notifications to certain users (referred to as notified users) when other users perform certain actions (e.g. read, print, copy, edit, etc.) on documents managed by the DRM system. In one aspect, the list of notified users who will receive event notifications is determined based the access permissions to the relevant document possessed by the users.

More specifically, in the DRM system, a notification rule is set for each document managed by the system, where the rule is based on a DRM protection policy associated with the document, so that users who have permission to perform a type of act on a document (e.g. read, print, copy, etc.) are allowed to receive event notifications when other users perform the same type of act on that document. Users who are allowed to receive event notifications can change their own notification settings so that they will not receive the notifications (i.e. they can opt out of the notifications). When a given event (e.g. read, print, copy, etc.) occurs on the document, information of the event is notified to each user who is allowed to receive the event notification and who has not opted out. As a result, acts of users on protected documents can be monitored by appropriate other users.

Figure 1:
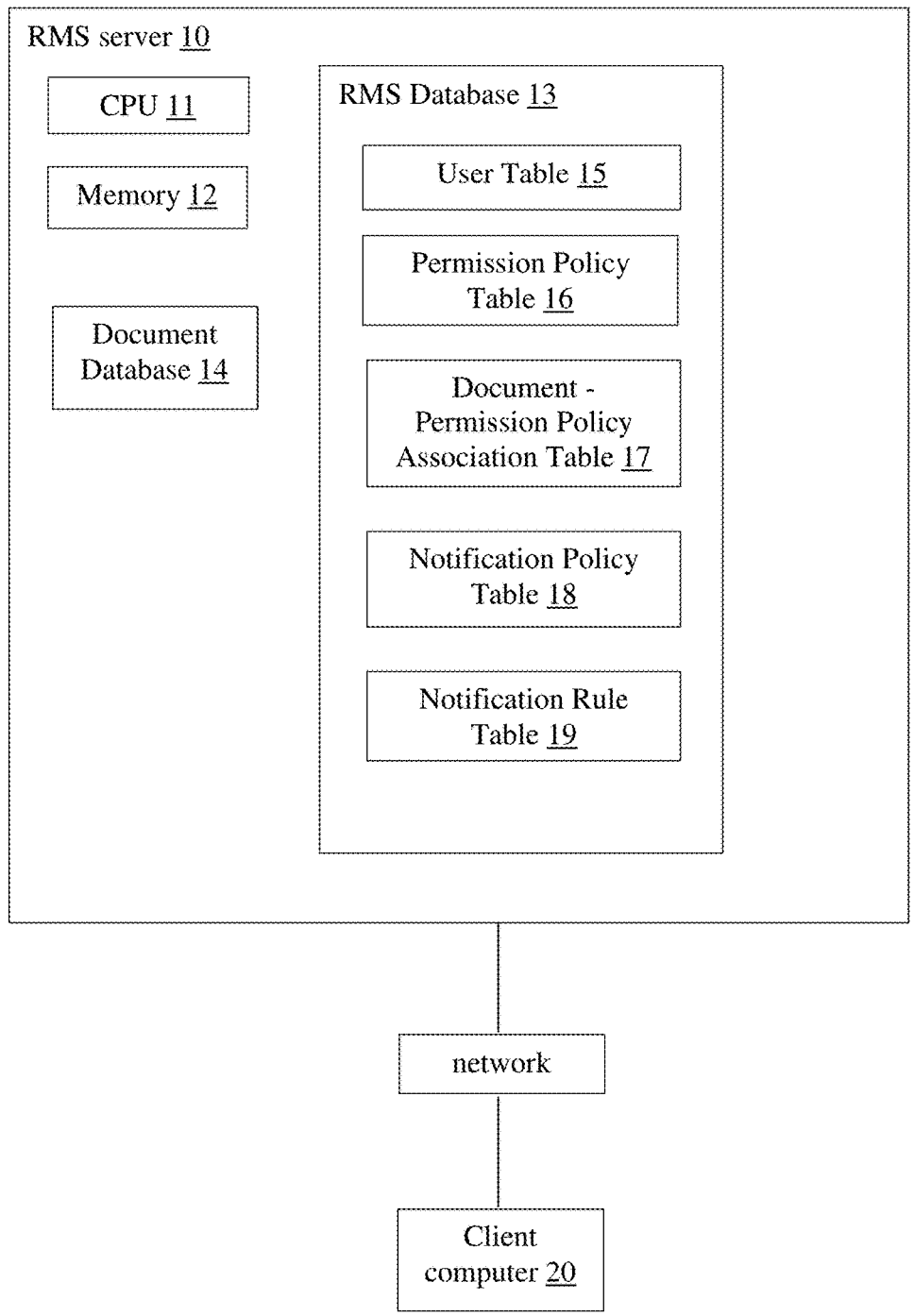
FIG. 1 schematically illustrates a digital rights management (DRM) system according to embodiments of the present invention.

FIG. 1 schematically illustrates a digital rights management (DRM) system that includes a digital rights management server (RMS server) 10 connected via a network to one or more client devices 20 such as client computers, tablets, smart phones, etc. The RMS server 10 includes hardware such as a CPU 11 for executing DRM programs stored in a memory 12. The RMS server 10 maintains a DRM database 13 which contains various DRM database tables, as well as a document database 14 which stores copies of the digital documents managed by the system (referred to as protected documents). The various DRM database tables, such as a user table 15, a permission policy table 16, a document—permission policy association table 17, a notification policy table 18, a notification rule table 19, etc., will be described in more detail below.

The RMS server 10 performs the conventional functions as described in the background section of this disclosure, including processing digital documents to associate DRM protection policies with them, storing the documents in the database 14, and responding to user requests from client devices 20 for accessing protected documents.

The client devices 20 are devices used by users to interact with the RMS server 10 to gain access to protected documents. The client device contains client software such as web browsers, Adobe™ Acrobat™, etc.

FIG. 2 schematically illustrates an example of the user table 15 maintained by the RMS server 10. The user table 15 includes, for each user of the DRM system, a User ID which uniquely identifies the user in the system, a Group name which describes the user group assigned to the user (e.g. in accordance with the organizational branch they belong to), a role name which describes the user's roles within the organization or group (e.g. title or position), and the user's contact information such as email addresses, phone number, other electronic message accounts, etc. The users' contact information is used for sending event notifications to users as will be described later.

FIG. 3 schematically illustrates an example of the permission policy table 16 maintained by the RMS server 10. The permission policy table 16 defines a plurality of permission policies, each identified by a permission policy ID, such as "Development", "Manager", etc. in the illustrated example. The permission policy IDs uniquely identifies the permission policies and can be referred to from other tables. Each permission policy contains information about the permissions (i.e. rights) granted to one or more users (as identified by the user IDs) to take one or more actions on a document. The permitted actions include, for example, read, print, or copy a document. In the illustrated example, the permission policy "Development" grants user Amy the rights to read, print and copy a relevant document, grants user Brian the rights to read and print a relevant document but not to copy it, etc.

FIG. 4 schematically illustrates an example of the document—permission policy association table 17 maintained by the RMS server 10. The document—permission policy association table 17 defines, for each document managed by the DRM system (as identified by the document ID), the permission policy (as identified by the permission policy ID) that is associated with the document. Each document is associated with one existing permission policy. In other words, the user access permissions for each document are defined by the associated permission policy.

The user table 15, permission policy table 16, and document—permission policy association table 17 may be similar to corresponding tables in conventional DRM systems. These tables are used to determine what access permissions a particular user has to a particular document. For example, when the RMS server receives a request from a particular user to access a particular document, the RMS server first looks up the document—permission policy association table 17 to determine the permission policy ID associated with the document, then looks up the permission polity table 16 to determine the permissions possessed by the particular user under that permission policy.

FIGS. 5 and 6 schematically illustrate examples of the notification policy table 18 and the notification rule table 19, respectively, maintained by the RMS server 10. The notification policy table 18 and the notification rule table 19 together define how and to whom the event notifications will be sent for each document. As shown in FIG. 6, the notification rule table 19 defines, for each document managed by the DRM system (as identified by the Document ID), a notification policy (as identified by the Notification Policy ID) that is associated with the document, and a list of users (as identified by User IDs) who will receive notifications and the types of events for which each user will be notified (the last three columns, labeled "Read", "Print" and "Copy"). The last four columns of the notification rule table 19 may be referred to as the notified user list for convenience. For a given document (e.g. Doc_001), if a type of event (e.g. "Read") for a particular user (e.g. "Amy") is "yes", it means that an event notification will be sent to Amy when another user performs that event ("Read"), subject to the terms set forth in the associated notification policy (here, "NotificationPilicy_1).

The notification policies are defined in the notification policy table 18, an example of which is shown in FIG. 5. Each notification policy is identified by a notification policy ID, which is a unique ID that can be referred to from other tables. Each notification policy in the table 18 contains the following fields:

"Narrowing down by Group": A flag; if set to "yes", notification will only be sent to users within the same group as the user whose action triggered the notification (the "triggering user"). As will be described later, this flag may change the list of users that will receive notifications as defined in the notified user list of the notification rule table 19.

"Narrowing down by Role": A flag; if set to "yes", notification will only be sent to users with the same or higher role as the triggering user. As will be described later, this flag may also change the list of users that will receive notifications as defined in the notified user list of the notification rule table 19.

"Allowing change of Rule": A flag which enables or disables changing of the notification rule for a document by the notified users (see further explanation below).

"Notifying User List": A flag; if set to "yes", during the rule setting stage, the notified users will be shown a user list that indicates which other users also have access permission to the document (see explanation of FIG. 11 below).

"Expired": A flag; if set to "yes", the expiration of the document will be deemed an event which will cause event notifications to be sent. Within the DRM system, each document may have an expiration date. Alternatively, the document may have multiple expiration dates corresponding to the read, print, copy, etc. actions on the document. In the latter case, each of expiration dates for read, print and copy will be notified to a user who has the corresponding permission.

Figure 7:
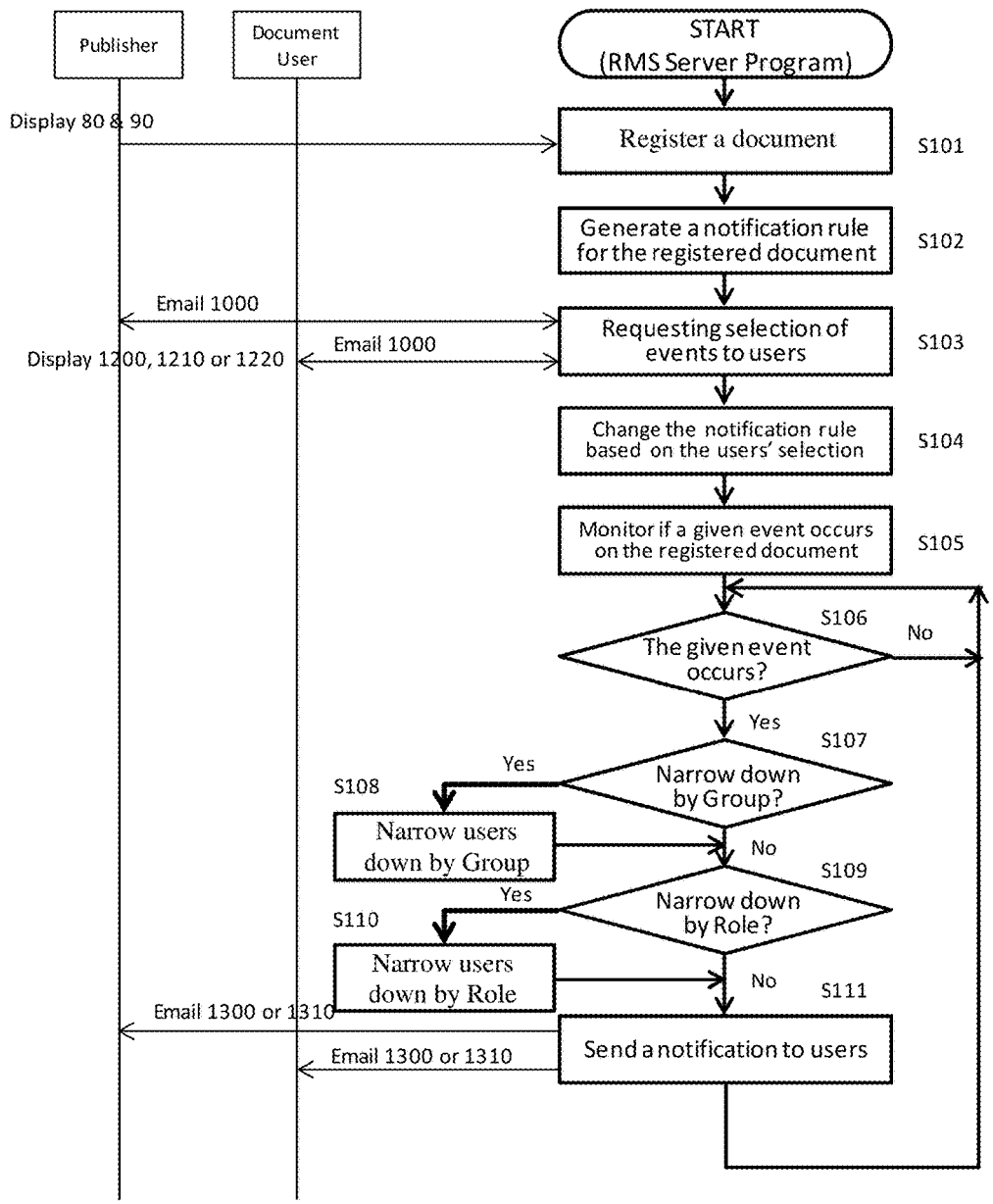
FIG. 7 is a flowchart that schematically illustrates a method executed by the RMS server according to an embodiment of the present invention.

FIG. 7 is a flowchart that schematically illustrates a method executed by the RMS server 10 according to an embodiment of the present invention. The method includes two stages: first, setting notification rules for documents (steps S101-S104), and second, sending out event notifications when certain events occur with respect to the documents (steps S105-S111). In this flowchart, "Publisher" refers to a user of the DRM system who adds a document to the system, and "Document User" refers to users of the DRM system who may have access rights to the document and may receive event notifications for the documents. The publishers and document users may interact with the RMS server using web-based user interfaces and/or email or other messaging systems as will be described in more detail below.

Figure 8:
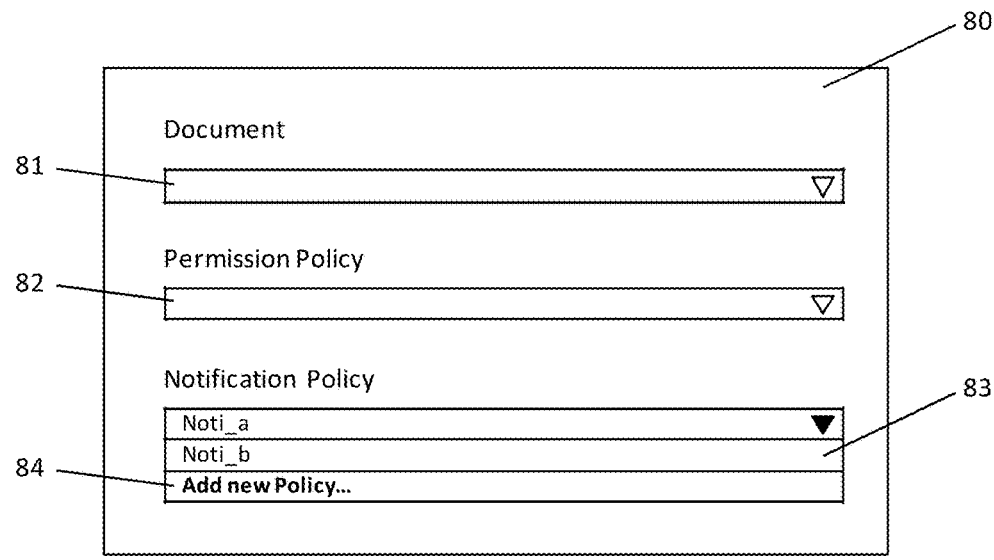
FIG. 8 schematically illustrates an example of a document registration window which is displayed to a document publisher when registering a document according to an embodiment of the present invention.
Figure 9:
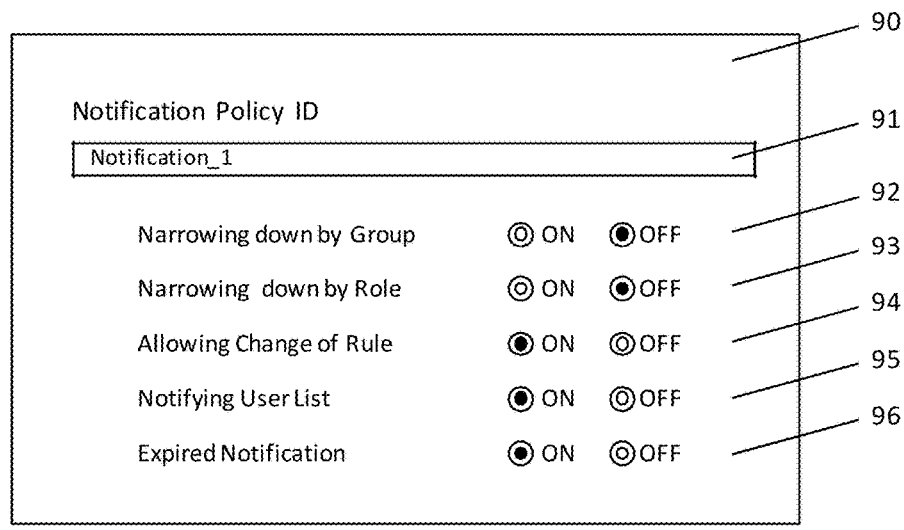
FIG. 9 schematically illustrates an example of a notification policy setting window which is displayed to a document publisher when registering a document according to an embodiment of the present invention.

First, the publisher registers a document with the RMS Server (step S101). In this step, the publisher selects a permission policy and a notification policy to be associated with the document. FIGS. 8 and 9 schematically illustrate exemplary user interface (UI) screens displayed by the RMS server in this step. FIG. 8 shows a document registration window 80 which is displayed when the publisher requests to register a document. The document registration window 80 contains a first input tool 81 (e.g. a combo box) for specifying the document to be registered, a second input tool 82 (e.g. a combo box) for selecting a permission policy to be associated with the document, and a third input tool 83 (e.g. a combo box) for selecting a notification policy to be associated with the document.

The third input tool 83 has a menu item 84 labeled "Add new policy"; when the publisher selects this item, a notification policy setting window 90 shown in FIG. 9 is displayed to allow the publisher to create a new notification policy. The notification policy setting window 90 has an input field for the publisher to enter a notification policy name, and multiple input tools 92-96 (e.g. radio buttons) to allow the publisher to set the various flags for the new notification policy, including Narrow down by Group, Narrow down by Role, Allowing end user to change Rule, Notifying User list, and Expired Notification. These flags correspond to the five columns in the notification policy table 18 explained earlier (see FIG. 5). The new policy is added to the notification policy table 18 as a part of step S101.

Based on the user input received via the document registration window 80 and (if applicable) the notification policy setting window 90, the RMS server generates a notification rule for the registered document (step S102). More specifically, the RMS server adds an entry in the notification rule table 19, which contains the document ID of the document being registered and the notification policy ID being associated with the document. Moreover, based on the permission policy ID entered by the publisher in the window 80, the RMS server looks up the permission policy table 16, and copies the content of the user access rights for the specified permission policy ID into the notified user list (the last four fields) of the notification rule table 19, i.e., the user IDs, and read, print and copy permissions for each user.

Figure 10:
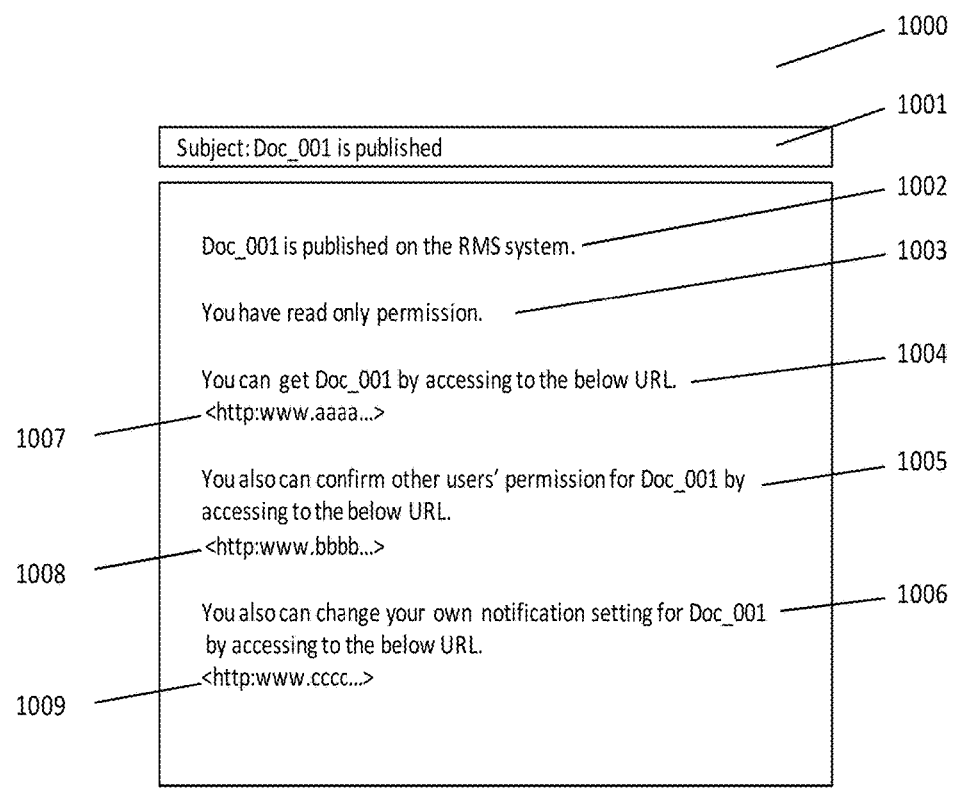
FIG. 10 schematically illustrates an example of a greeting message which is displayed to a notified user when the publisher registers a document according to an embodiment of the present invention.

Then, the RMS server sends a notification (referred to as the greeting message) to each user that is listed in the user list of the newly created entry of the notification rule table 19, to notify the user that a document is being registered in the DRM system and to allow the user to change the notification rule settings (step S103). The greeting message may be sent to each user by email, text message, or other forms of messages. An example of the greeting message is shown in FIG. 10. In the illustrated example, the message 1000 contains a subject line of the greeting message 1001, a description 1002 of the event that has just occurred (e.g. a document is being published), a description 1003 of permission(s) given to this user to access the document, a description 1004 of how the user can access the document (e.g. a link 1007 to access the document), a description 1005 of how the user can see other users' permissions to access this document (e.g. a link 1008 to a first web-based tool on the RMS server), and a description 1006 of how the user can change the notification settings for the document that pertains to him (e.g. a link 1009 to a second web-based tool on the RMS server).

The first web-based tool on the RMS server, accessed by link 1008, provides details of other users' permissions to this document to inform the notified user about which other users have what kinds of access permissions to the document, and allows the notified user to confirm the other users' permissions. FIG. 11 illustrates an example of the information shown by the first web-based tool which is displayed when the user clicks the link 1008. For each notified user, e.g., Amy, Brian, etc., the information displayed by the first web-based tool is different, based on the access permissions the notified user has for the document. More specifically, if the notified user is granted a certain type of permission to the document (e.g. read, print, etc.), then he/she will be shown information indicating which other users have that type of permission; if the notified user is not granted a certain type of permission to the document, then he/she will not be shown information indicating which other users have that type of permission. In the illustrated example in FIG. 11, user Amy has read, print and copy permissions for document Doc_001 (see FIG. 6), so the content of the first web-based tool displayed to Amy (the top panel in FIG. 11) shows which other users have read, print and copy permission. On the other hand, user Brian has read and print but not copy permissions for Doc_001, so the content of the first web-based tool displayed to Brian (the middle panel in FIG. 11) shows which other users have read and print permissions, but does not show which other users have copy permissions, as indicated by the gray areas in the display. User Frank only has read permission, so the display for him only shows which other users have read permission (the bottom panel in FIG. 11).

The first web-based tool on the RMS server may optionally include input tools (not shown in FIG. 11) to allow some users to change the permissions of other users. In a preferred embodiment, a user can only change the permissions of other uses who belong to the same group and have lower roles than himself.

Note that the "notifying user list" flag of the notification policy (see FIG. 5) associated with the document specifies whether the list of permissions of other users will be displayed to the notified user. If the flag is set to No, then the message 1005 and the link 1008 will not be a part of the greeting message 1000, so the first web-based tool (FIG. 11) will not be made available to the notified user.

The second web-based tool on the RMS server, which is displayed when the notified user clicks the link 1009 in the greeting message, allows the notified user to change his/her notification settings. Examples of this display are shown in FIG. 12. For each notified user, e.g., Amy, Brian, etc., the content of the display of the second web-based tool is different, based on the access permissions the notified user has for the document. More specifically, each notified user is allowed to change the notification setting for only the events (read, print, copy, etc.) that he himself has permission to perform. For each event that the user has permission for, the notification setting is initially set to On, and the user can change it to Off. In this sense, the second web-based tool is an opt-out tool that allows the user to opt out of some notifications. Here, note that for the "document expired" event, all users that have some permission to the document are set to receive the notification initially. The second web-based tool also allows the user to select the methods for delivering the event notifications for each type of events.

In the illustrated examples in FIG. 12, in the display 1200 for the user Amy, the radio buttons 1201, 1202, 1203 and 1204 can be used to set the notification setting for read, print, copy, and expired events, respectively. Fields 1205 allows the user to select the notification delivery method, such as email, short message service (SMS), messenger, social network, etc. In the display 1210 for the user Brian, the notification setting for read, print, and expired events can be set using buttons 1211, 1212 and 1214, because Brian has permission perform read and print; but since he has no permission to copy, the display 1210 does not allow him to change the notification setting for copy, as indicated at 1213. Similarly, in the display 1220 for the user Frank or Harry, the notification setting for read 1221 and expired 1224 can be set, but that for print 1222 and copy 1223 cannot be changed.

Note that the "allowing change of rule" flag of the notification policy (see FIG. 5) specifies whether the user is allowed to change his own notification setting. If the flag is set to No, then the message 1006 and the link 1009 will not be a part of the greeting message 1000, so the second web-based tool (FIG. 12) will not be made available to the notified user and the user cannot change his own notification settings.

After the RMS server receives the users' input to change the notification settings via the second web-based tool, the RMS server accordingly changes the notification rule for the document being registered (step S104). More specifically, the RMS server changes the values of the notified user list in the notification rule table 19 based on the users' input. For example, if the user Amy changed the notification setting for "read" events from On to Off, then in the notification rule table 19, the "read" field for Amy for Doc_001 is changed from On to Off. Recall that the initial values of these settings are copied from the permission values from the permission policy table 16, i.e. if the user has permission to print, he is initially set to receive print notification when others print the document. In step S103, the user is able to change the setting from On to Off, i.e., to opt out of the notification, and in step S104, such changes are saved in the notification rule table 19.

Although not shown in FIG. 4, the notification rule table 19 also contains the notification delivery method for each user and each action. The notification delivery method may be initially set to a default method (e.g. email), and if the user modifies them using the second web-based tool (FIG. 12), the RMS server updates the delivery methods in the notification rule table 19, so that future notifications will be sent accordingly.

This concludes the first stage which sets notification rules for the document being registered. This stage is performed each time a new protected document is registered in the DRM system.

In the second stage, the RMS Server continuously monitors various events, such as read, print, copy, expired, that occur on registered documents (steps S105 and S106). Note that in this disclosure the terms "event" and "action" are used interchangeably when the events are caused by user actions, although there are also events such as "expired" that are not caused by user actions. If the RMS server detects that a given event occurred on a document (Yes in step S106), the RMS server refers to the notification rule table 19 to determine the list of users to be notified (steps S107 to S110). The list of users to be notified is initially obtained from the notified user list (the last four columns) of the notification rule table 19, and is then narrowed down based on the setting of the notification policy that is associated with the document in the notification rule table 19. More specifically, the RMS server refers to the notification policy table 18 to find the contents of the notification policy that is associated with the document, then based on the "narrowing down by group" and "narrowing down by role" settings of that notification policy, the RMS server determines whether the initial list of notified users is to be narrowed down (steps S107, S108, S109, S110). To accomplish this, the RMS server refers to the user table 15 to obtain the group and role of the relevant users. For example, if the setting for "narrowing down by role" in the notification policy is set to "yes", and if the user who performed the detected event is an engineer, then the list of users to be notified will be narrowed down to only engineers, i.e., users who have different roles will be eliminated from the list and will not receive the event notification.

After the list of users to be notified is modified by the narrowing down steps, the RMS server sends an event notification to each of the remaining users on the list, using the selected notification method for each user (step S111). The process then returns to step S106 to continue to monitor events.

Examples of event notifications sent by the RMS server in the notification step S111 are shown in FIG. 13. The display 1300 is an example of a notification for a print event. The notification includes a description 1301 of the document that was printed, e.g. the document ID or some other identifiers such as a file name; the user ID 1302 of the user who printed the document; a description of the number of copies that the document was printed; a description 1303 of the printer where document was printed, e.g. a printer name and/or its location; and a note 1304 to the notified user that he can change his own notification settings for this document, along with details 1305 for changing notification settings, such as a link to a web-based tool for changing the notification setting. This web-based tool may be the same as the second web-based tool shown in FIG. 12. Note that the notification message may be customized for each user because the link 1305 may be different for different users.

The display 1310 is an example of an event notification for a read event. Similar to the print event notification 1300, the read event notification display 1310 includes a description 1311 of the document that was read, the user ID 1312 of the user who read the document, a description 1313 of the device on which the document was read, and a note 1314 to the notified user that he can change his own notification settings for this document along with details for changing notification settings such as a link 1315 to a web-based tool.

Note that the "allowing change of rule" flag of the associated notification policy (see FIG. 5) specifies whether the user is allowed to change his notification setting. If the flag is set to No, then the message 1304/1314 and the link 1305/1315 will not be a part of the notification message 1300/1310.

Note that in the above descriptions, the notification that is sent in step S103, when the document is initially published (i.e. registered) in the DRM system, is referred to as a greeting message; it may be viewed as a notification that is sent when the document publication event is detected.

In some embodiments, the notification rules for each document may define other events that can be monitored and will trigger event notifications, such as deletion of a document, failure to access the document by a user within a defined time period, change of permission policy for a document, change of a document (its content, size, property such as author, title, etc.), etc.

Still other examples of monitored events for notification purposes may include when a document is accessed during defined time periods (such as out of business hours, weekends, etc.), when a document is accessed more than a defined number of times during a defined time period, etc.

FIG. 14 schematically illustrates an example of a notification sent to various users when a change of permission policy for a document occurred. In the DRM system, permissions to access a document may be changed by, for example, the original publisher of the document or an administrative user. In the illustrated example, the following permissions have been changed: Brian's print permission is changed to No, Frank's print permission is changed to Yes, and Harry's read permission is changed to No. The notification displays shown in FIG. 14 includes a list of users and their permissions, with the changes highlighted. Similar to the displays shown in FIG. 11 (which are a part of the greeting message when the document is initially registered), only users who have a particular permission can see the same permission for other users.

For example, in the top panel of FIG. 14, for user Amy, since she still has read, print and copy permissions, the display shown to her includes the read, print and copy permissions for other users, with the above-mentioned three changes highlighted. In the second panel, for user Brian, since he no longer has print permission, the print permissions for other users are no longer displayed (as indicated by the gray areas). In addition, his own print permission (No) is highlighted to inform him of the change. In the third panel, for Frank, since he now has print permission, the print permissions for other users are now displayed.

The notification methods implemented in the DRM system enhances overall effectiveness of document control. A conventional RMS server realizes security (management) for a protected document by associating a permission policy with the document. However, even if a strict policy is established, high-level management ability as the whole system cannot be realized without users' cooperation. The notification system enhances the user's knowledge and awareness of his own and other users' access permissions and changes in permissions, which allows the users to help enforce the document control policies. Further, because an event is not notified to a user who himself has no permission to perform the event, document security management ability is not decreased by the notifications.

It will be apparent to those skilled in the art that various modification and variations can be made in the digital rights management system and method of the present invention without departing from the spirit or scope of the invention. Thus, it is intended that the present invention cover modifications and variations that come within the scope of the appended claims and their equivalents.

What is claimed is:

1. A digital rights management method implemented in a server of a digital right management (DRM) system, comprising:

(a) obtaining a permission policy that is associated with a digital document managed by the DRM system, wherein the permission policy defines, for each of a plurality of users of the DRM system, whether or not the user has permission to take each of a plurality of actions on the document;

(b) generating a notification rule for the document based on the permission policy obtained in step (a), wherein the notification rule defines, for each of the plurality of users, a plurality of notification settings each corresponding to one of the plurality of actions, wherein for each one of the plurality of actions, the corresponding notification setting is always set to Off if the user does not have permission to take the corresponding action under the permission policy, and the corresponding notification setting is initially set to On if the user has permission to take the corresponding action under the permission policy;

(c) continuously monitoring actions taken by any of the plurality of users on the document; and (d) when an action by a user on the document is detected in step (c), sending event notifications to some or all of the plurality of users whose notification settings corresponding to the detected action are set to On, without sending event notifications to any of the plurality of users whose notification settings corresponding to the detected action are set to Off;

wherein in step (d), when the detected action is a publication of the document or a change of permission policy associated with the document, the event notification sent to each receiving user include a list of one or more other users, and for each one of the plurality of actions that the receiving user has permission to take under the permission policy, the event notification contains an indication of whether or not each of the other users in the list has permission to take that action, and for each one of the plurality of actions that the receiving user does not have permission to take under the permission policy, the event notification contains an indication of the action but no indication of whether or not each of the other users in the list has permission to take that action.

2. The method of claim 1, wherein the plurality of actions include at least one of read, print and copy.

3. The method of claim 1, further comprising:
(e) obtaining user information that associates each user with a group,
wherein in step (d), the event notifications are sent only to users whose notification settings corresponding to the detected action are set to On and who belong to the same group as the user who took the detected action.

4. The method of claim 1, further comprising:
(f) obtaining user information that associates each user with a role,
wherein in step (d), the event notifications are sent only to users whose notification settings corresponding to the detected action are set to On and who have an equal role as or a higher role than the user who took the detected action.

5. The method of claim 1, wherein the event notifications include an identity of the user who took the detected action on the document.

6. The method of claim 1, wherein the detected action on the document is a print action, and wherein the event notification includes an identity of a printer used to print the document and a number of copies of the document that was printed.

7. The method of claim 1, wherein the detected action on the document is a read action, and wherein the event notification includes an identity of a device used to read the document.

8. The method of claim 1, wherein each event notification sent in step (d) includes an opt-out request for the user who receives the event notification to select or deselect one or more actions from a list of actions, wherein the list of actions excludes any actions which that user does not have permission to take under the permission policy;
wherein the method further comprises:
(g) receiving input from a user in response to the opt-out request;
(h) changing the notification rule for the document, by changing the notification settings for that user based on the user input received in step (g).

9. The method of claim 1, wherein each event notification sent in step (d) includes a request for the user who receives the event notification to select a notification method for receiving further event notifications, the notification method being selected from among at least one of email, short message service (SMS), messenger and social network;
wherein the method further comprises repeating steps (c) and (d), wherein in repeated step (d), the event notifications are sent using the notification methods selected by the users.

10. A computer program product comprising a computer usable non-transitory medium having a computer readable program code embedded therein for controlling a server of a digital right management (DRM) system, the computer readable program code configured to cause the server to execute a digital rights management process, the process comprising:

(a) obtaining a permission policy that is associated with a digital document managed by the DRM system, wherein the permission policy defines, for each of a plurality of users of the DRM system, whether or not the user has permission to take each of a plurality of actions on the document;

(b) generating a notification rule for the document based on the permission policy obtained in step (a), wherein the notification rule defines, for each of the plurality of users, a plurality of notification settings each corresponding to one of the plurality of actions, wherein for each one of the plurality of actions, the corresponding notification setting is always set to Off if the user does not have permission to take the corresponding action under the permission policy, and the corresponding notification setting is initially set to On if the user has permission to take the corresponding action under the permission policy;

(c) continuously monitoring actions taken by any of the plurality of users on the document; and (d) when an action by a user on the document is detected in step (c), sending event notifications to some or all of the plurality of users whose notification settings corresponding to the detected action are set to On, without sending event notifications to any of the plurality of users whose notification settings corresponding to the detected action are set to Off;

wherein in step (d), when the detected action is a publication of the document or a change of permission policy associated with the document, the event notification sent to each receiving user include a list of one or more other users, and for each one of the plurality of actions that the receiving user has permission to take under the permission policy, the event notification contains an indication of whether or not each of the other users in the list has permission to take that action, and for each one of the plurality of actions that the receiving user does not have permission to take under the permission policy, the event notification contains an indication of the action but no indication of whether or not each of the other users in the list has permission to take that action.

11. The computer program product of claim 10, wherein the plurality of actions include at least one of read, print and copy.

12. The computer program product of claim 10, wherein the process further comprises:
  (e) obtaining user information that associates each user with a group,
  wherein in step (d), the event notifications are sent only to users whose notification settings corresponding to the detected action are set to On and who belong to the same group as the user who took the detected action.

13. The computer program product of claim 10, wherein the process further comprises:
  (f) obtaining user information that associates each user with a role,
  wherein in step (d), the event notifications are sent only to users whose notification settings corresponding to the detected action are set to On and who have an equal role as or a higher role than the user who took the detected action.

14. The computer program product of claim 10, wherein the event notifications include an identity of the user who took the detected action on the document.

15. The computer program product of claim 10, wherein the detected action on the document is a print action, and wherein the event notification includes an identity of a printer used to print the document and a number of copies of the document that was printed.

16. The computer program product of claim 10, wherein the detected action on the document is a read action, and wherein the event notification includes an identity of a device used to read the document.

17. The computer program product of claim 10, wherein each event notification sent in step (d) includes an opt-out request for the user who receives the event notification to select or deselect one or more actions from a list of actions, wherein the list of actions excludes any actions which that user does not have permission to take under the permission policy;
  wherein the process further comprises:
  (g) receiving input from a user in response to the opt-out request;
  (h) changing the notification rule for the document, by changing the notification settings for that user based on the user input received in step (g).

18. The computer program product of claim 10, wherein each event notification sent in step (d) includes a request for the user who receives the event notification to select a notification method for receiving further event notifications, the notification method being selected from among at least one of email, short message service (SMS), messenger and social network;
  wherein the process further comprises repeating steps (c) and (d), wherein in repeated step (d), the event notifications are sent using the notification methods selected by the users.

19. A digital rights management method implemented in a server of a digital right management (DRM) system, comprising:
  (a) obtaining a permission policy that is associated with a digital document managed by the DRM system, wherein the permission policy defines, for each of a plurality of users of the DRM system, whether or not the user has permission to take each of a plurality of actions on the document;
  (b) generating a notification rule for the document based on the permission policy obtained in step (a), wherein the notification rule defines, for each of the plurality of users, a plurality of notification settings each corresponding to one of the plurality of actions, wherein for each one of the plurality of actions, the corresponding notification setting is always set to Off if the user does not have permission to take the corresponding action under the permission policy, and the corresponding notification setting is initially set to On if the user has permission to take the corresponding action under the permission policy;
  (c) continuously monitoring actions taken by any of the plurality of users on the document; and
  (d) when an action by a user on the document is detected in step (c), sending event notifications to some or all of the plurality of users whose notification settings corresponding to the detected action are set to On, without sending event notifications to any of the plurality of users whose notification settings corresponding to the detected action are set to Off, wherein the detected action on the document is a read action, and wherein the event notification includes an identity of a physical device used to read the document.

20. A computer program product comprising a computer usable non-transitory medium having a computer readable program code embedded therein for controlling a server of a digital right management (DRM) system, the computer readable program code configured to cause the server to execute a digital rights management process, the process comprising:
  (a) obtaining a permission policy that is associated with a digital document managed by the DRM system, wherein the permission policy defines, for each of a plurality of users of the DRM system, whether or not the user has permission to take each of a plurality of actions on the document;
  (b) generating a notification rule for the document based on the permission policy obtained in step (a), wherein the notification rule defines, for each of the plurality of users, a plurality of notification settings each corresponding to one of the plurality of actions, wherein for each one of the plurality of actions, the corresponding notification setting is always set to Off if the user does not have permission to take the corresponding action under the permission policy, and the corresponding notification setting is initially set to On if the user has permission to take the corresponding action under the permission policy;
  (c) continuously monitoring actions taken by any of the plurality of users on the document; and
  (d) when an action by a user on the document is detected in step (c), sending event notifications to some or all of the plurality of users whose notification settings corresponding to the detected action are set to On, without sending event notifications to any of the plurality of users whose notification settings corresponding to the detected action are set to Off, wherein the detected action on the document is a read action, and wherein the event notification includes an identity of a physical device used to read the document.

\* \* \* \* \*